Aug. 20, 1946.  G. REUTER  2,406,038

SUPPORT FOR CLUTCH BANDS

Filed May 27, 1944

INVENTOR.
Gottfried Reuter
BY Hoar + Ruhloff
ATTORNEYS.

Patented Aug. 20, 1946

2,406,038

UNITED STATES PATENT OFFICE 2,406,038

SUPPORT FOR CLUTCH BANDS

Gottfried Reuter, South Milwaukee, Wis., assignor to Bucyrus-Erie Company, Milwaukee, Wis., a corporation of Delaware Application May 27, 1944, Serial No. 537,717

8 Claims. (Cl. 188—77)

My invention relates to new and useful improvements in supports for clutch bands, more particularly for the clutch bands of planetary clutches, and still more particularly for the clutch bands of planetary winches.

The particular type of winch to which my invention is especially applicable is that type of winch built to be attached to the rear end of a tractor, and to be driven by the power take-off shaft of such tractor; for example, a winch of the general sort described and shown in U. S. Patent No. 2,199,668, dated May 7, 1940, to Frank P. Lawler.

The principal object of the present invention is to provide supports which will pull the clutch band away from the clutch drum when the clutch is released, and which will at all times stabilize the clutch band laterally, thus preventing chattering.

In addition to my principal objects, above stated, I have worked out a number of novel and useful details, which will be readily evident as the description progresses.

My invention consists in the novel parts and in the combination and arrangement thereof, which are defined in the appended claims, and of which one embodiment is exemplified in the accompanying drawing, which are hereinafter particularly described and explained.

Throughout the description, the same reference number is applied to the same member or to similar members.

Figure 1:
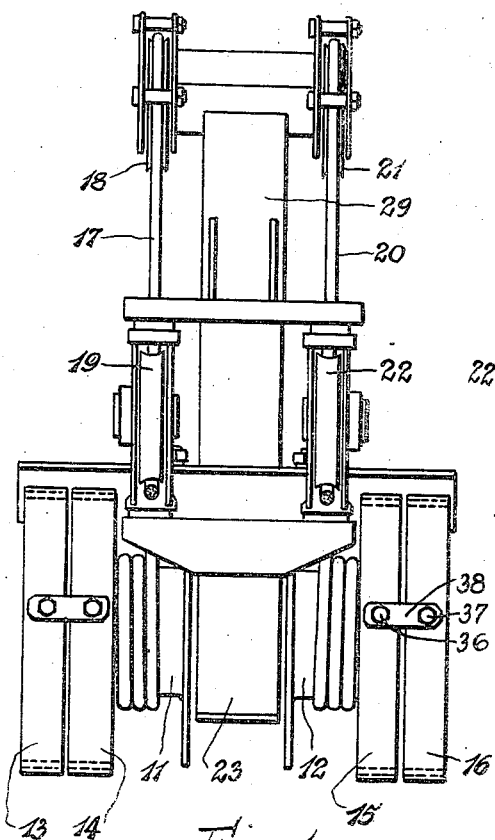
Figure 1 is a rear elevation of a winch embodying the subject-matter of my present invention.
Figure 2:
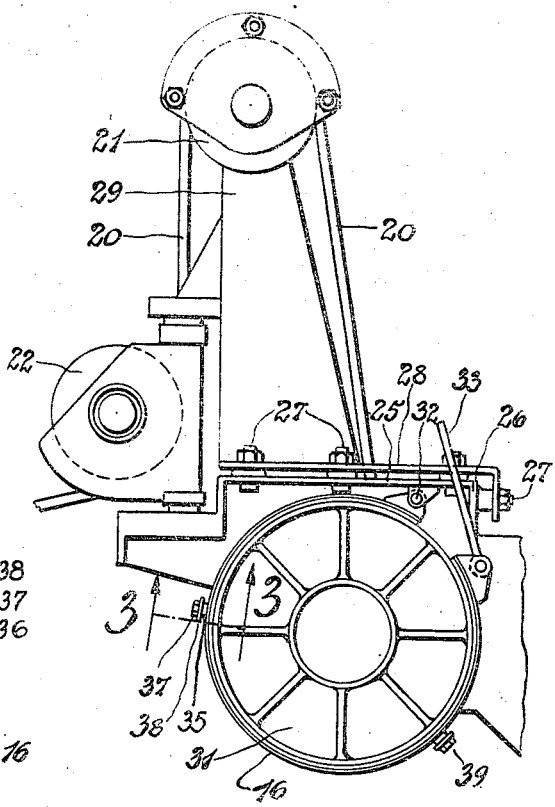
Figure 2 is a side elevation of the same.

Turning now to the figures, we see that my winch consists primarily in two drums 11, 12, each actuated by conventional planetary gearing. Drum 11 is controlled by clutch band 14 and brake band 13. Drum 12 is similarly controlled by clutch band 15 and brake band 16.

Rope 17 extends, from drum 11, over fairlead sheave 18, under swiveled fairlead sheave 19, and thence to the work (not shown). Rope 20 similarly extends, from drum 12, over fairlead sheave 21, under swiveled fairlead sheave 22, and thence to the work (not shown).

The main gear-case or housing 23 has a flat face (not shown), adapted to be secured to the rear end of the tractor (not shown) in any convenient manner, as by bolts (not shown).

The top plate 25 of this housing 23, and its rear face 26 are furnished with bolts 27, or any other convenient quickly detachable means for attaching the removable L-shaped deck-plate 28.

Built integral with this deck-plate 28, as by welding, is a hollow mast 29. This mast carries sheaves 18 and 21 already mentioned. This construction is the subject-matter of the copending application of George W. Mork, Serial No. 501,113, for Fairleads for winches, owned by a common assignee.

Brake band 15 controls brake drum 30, and clutch band 16 controls clutch drum 31, of a conventional planetary gearing. Clutch band 16 is dead-ended on housing 23, as at 32, and is set and unset by rod 33, which leads to appropriate actuating mechanism (not shown). Brake band 15 is similarly dead-ended and actuated.

Clutch band 13 and brake band 14 have similar adjuncts.

We now come to my particular improvement.

Figure 3:
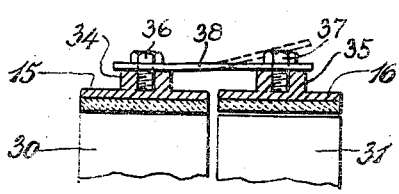
Figure 3 is an enlargement of a section taken along the lines 3—3 of Figure 2.

A boss 34 on brake band 15, and a boss 35 on clutch band 16 are threaded internally to fit bolts 36 and 37 respectively. A piece of spring steel 38 is secured to the two bosses by the two bolts. The dotted lines in Figure 3 show the initial bend in this spring when secured to the brake band and before being screwed down onto the clutch band. In that figure the clutch band is shown withdrawn from its drum by the action of the spring, when the clutch band has been released.

It is to be noted that this construction also tends to withdraw the brake band from its drum when the brake band is released.

This construction is duplicated at 39, and at two corresponding locations at the other side of my winch.

It is to be understood that the initial bend in the leaf spring could be gradual rather than sharp.

It is to be understood that other spring means could be substituted, although my simple construction is believed to be the best. Also that the number of these band-release mechanisms on each side of my winch is not necessarily two.

Having now described and illustrated one form of my invention, I wish it to be understood that my invention is not to be limited to the specific form or arrangement of parts herein described and shown.

I claim:

1. In a planetary transmission, the combination of: a clutch drum; a clutch band; a brake drum; a brake band, the two bands being selectively operable; and spring means connected solely to the two bands and in such manner as to tend to pull the clutch band clear of the clutch drum, when the clutch is released.

2. In a planetary transmission, the combination of: a clutch drum; a clutch band; a brake drum; a brake band, the two bands being selectively operable; and spring means connected solely to the two bands and in such manner as to tend to pull the clutch band clear of the clutch drum, when the clutch is released, and to tend to pull the brake band clear of the brake drum, when the brake is released.

3. In a planetary transmission, the combination of: a clutch drum; a clutch band; a brake drum; a brake band; and a leaf spring having an initial outward bend and secured flat to and supported solely by a boss on each of the bands, whereby the spring tends to pull the clutch band clear of the clutch drum when the clutch is released.

4. In a planetary transmission, the combination of: a clutch drum; a clutch band; a brake drum; a brake band; and a leaf spring secured flat to and supported solely by a boss on each of the bands, whereby the spring tends to pull the clutch band clear of the clutch drum when the clutch is released.

5. In a planetary transmission, the combination of: a clutch drum; a clutch band; a brake drum; a brake band; and a leaf spring having an initial outward bend and secured flat to and supported solely by each of the bands, whereby the spring tends to pull the clutch band clear of the clutch drum when the clutch is released.

6. In a planetary transmission, the combination of: a clutch drum; a clutch band; a brake drum; a brake band; and a leaf spring secured flat to and supported solely by each of the bands, whereby the spring tends to pull the clutch band clear of the clutch drum when the clutch is released.

7. In a planetary transmission, the combination of: a clutch drum; a clutch band; a brake drum; a brake band; and spring means supported solely by the two bands acting radially outwardly, so as to tend to pull the clutch band clear of the clutch drum, when the clutch is released.

8. In a planetary transmission, the combination of: a clutch drum; a clutch band; a brake drum; a brake band; and spring means supported solely by the two bands acting radially outwardly so as to tend to pull the clutch band clear of the clutch drum, when the clutch is released, and to tend to pull the brake band clear of the brake drum, when the brake is released.

GOTTFRIED REUTER.